United States Patent
Cates et al.

(10) Patent No.: US 7,037,346 B2
(45) Date of Patent: *May 2, 2006

(54) TEXTILE SUBSTRATE HAVING COATING CONTAINING MULTIPHASE FLUOROCHEMICAL AND CATIONIC MATERIAL THEREON FOR IMAGE PRINTING

(75) Inventors: Elizabeth Cates, Duncan, SC (US); Daniel T. McBride, Chesnee, SC (US); William C. Kimbrell, Spartanburg, SC (US); Kirkland W. Vogt, Simpsonville, SC (US)

(73) Assignee: Milliken & Company, Spartanburg, SC (US)

( * ) Notice: Subject to any disclaimer, the term of this patent is extended or adjusted under 35 U.S.C. 154(b) by 261 days.

This patent is subject to a terminal disclaimer.

(21) Appl. No.: 10/044,173

(22) Filed: Oct. 22, 2001

(65) Prior Publication Data

US 2003/0224680 A1  Dec. 4, 2003

(51) Int. Cl.
*D06M 13/00* (2006.01)

(52) U.S. Cl. .................. 8/115.51; 8/115.54; 8/445; 8/478; 8/495; 428/85; 428/96; 442/79; 442/82; 442/83; 442/86; 442/88; 442/89; 442/181; 442/304; 442/327

(58) Field of Classification Search ............... 428/85, 428/96; 442/59, 79, 81, 82, 83, 84, 86, 87, 442/88, 89, 90, 181, 304, 327; 8/478, 445, 8/495, 115.51, 115.54
See application file for complete search history.

(56) References Cited

U.S. PATENT DOCUMENTS

| | | | |
|---|---|---|---|
| 3,574,791 A | * | 4/1971 | Sherman et al. ............. 525/276 |
| 3,589,906 A | | 6/1971 | McDowell ..................... 96/87 |

(Continued)

FOREIGN PATENT DOCUMENTS

| | | |
|---|---|---|
| EP | 0 896 883 | 3/2003 |
| JP | 60-99081 | 6/1985 |
| WO | WO99/54144 | 10/1999 |
| WO | 02/36354 | 5/2002 |
| WO | 03/020502 | 3/2003 |

OTHER PUBLICATIONS

SciFinder; ink–jet; Nov. 6, 2001; pp. 2–3.

*Primary Examiner*—Ula Ruddock
(74) *Attorney, Agent, or Firm*—Terry T. Moyer; Cheryl J. Brickey; Jeffery E. Bacon

(57) ABSTRACT

A textile coated with a coating having multiphase fluorochemical and a cationic material. A printed image is subsequently placed on the coated textile.

14 Claims, 1 Drawing Sheet

Effect of Chemistry on Print Quality

U.S. PATENT DOCUMENTS

| | | | |
|---|---|---|---|
| 3,728,151 A * | 4/1973 | Sherman et al. ............... | 442/80 |
| 4,027,049 A | 5/1977 | Masuda et al. ............... | 427/19 |
| 4,397,650 A | 8/1983 | Gregorian et al. ............. | 8/477 |
| 4,554,181 A | 11/1985 | Cousin et al. ............... | 427/261 |
| 4,740,214 A | 4/1988 | McBride et al. ............... | 8/561 |
| 4,786,288 A | 11/1988 | Handa et al. ................. | 8/495 |
| 4,808,191 A | 2/1989 | Gregory et al. ................ | 8/478 |
| 5,143,991 A | 9/1992 | Amimoto et al. ........... | 526/245 |
| 5,192,617 A | 3/1993 | Stofko et al. ............ | 428/411.1 |
| 5,208,092 A | 5/1993 | Iqbal ......................... | 428/195 |
| 5,372,884 A | 12/1994 | Abe et al. ................... | 428/331 |
| 5,376,727 A | 12/1994 | Iqbal et al. ................. | 525/196 |
| 5,403,358 A | 4/1995 | Aston et al. ................... | 8/445 |
| 5,429,860 A | 7/1995 | Held et al. .................. | 428/195 |
| 5,510,415 A | 4/1996 | Zahrobsky et al. ......... | 524/506 |
| 5,537,137 A | 7/1996 | Held et al. .................. | 347/105 |
| 5,631,684 A | 5/1997 | Takaide et al. ............. | 347/100 |
| 5,660,928 A | 8/1997 | Stokes et al. ............... | 428/331 |
| 5,698,478 A | 12/1997 | Yamamoto et al. ......... | 442/153 |
| 5,709,748 A | 1/1998 | Sassa et al. ................. | 118/262 |
| 5,714,082 A | 2/1998 | Boardman et al. ......... | 252/8.62 |
| 5,770,531 A | 6/1998 | Sudduth et al. ............. | 442/361 |
| 5,853,861 A * | 12/1998 | Held .......................... | 428/207 |
| 5,916,673 A | 6/1999 | Fryberg et al. ............. | 428/328 |
| 5,925,712 A | 7/1999 | Kronzer ..................... | 524/555 |
| 5,962,149 A | 10/1999 | Kronzer ................... | 428/537.5 |
| 6,001,137 A | 12/1999 | Alfekri et al. ................. | 8/445 |
| 6,020,032 A | 2/2000 | Romano, Jr. et al. ....... | 427/411 |
| 6,033,739 A | 3/2000 | Kronzer ..................... | 427/391 |
| 6,054,399 A | 4/2000 | Lebold et al. ................. | 442/98 |
| 6,096,469 A | 8/2000 | Anderson et al. ........... | 430/119 |
| 6,103,364 A | 8/2000 | Harris et al. ................ | 428/326 |
| 6,120,888 A | 9/2000 | Dolsey et al. .............. | 428/222 |
| 6,153,263 A | 11/2000 | Haruta et al. ................ | 427/261 |
| 6,156,072 A | 12/2000 | Usui et al. .................... | 8/115.6 |
| 6,214,417 B1 | 4/2001 | Watanabe et al. ........... | 427/394 |
| 6,270,214 B1 | 8/2001 | Smith et al. ................. | 347/101 |
| 6,465,078 B1 | 10/2002 | Kawai et al. ............ | 428/32.26 |
| 2005/0098759 A1 | 5/2005 | Frankenbach et al. ...... | 252/8.91 |

* cited by examiner

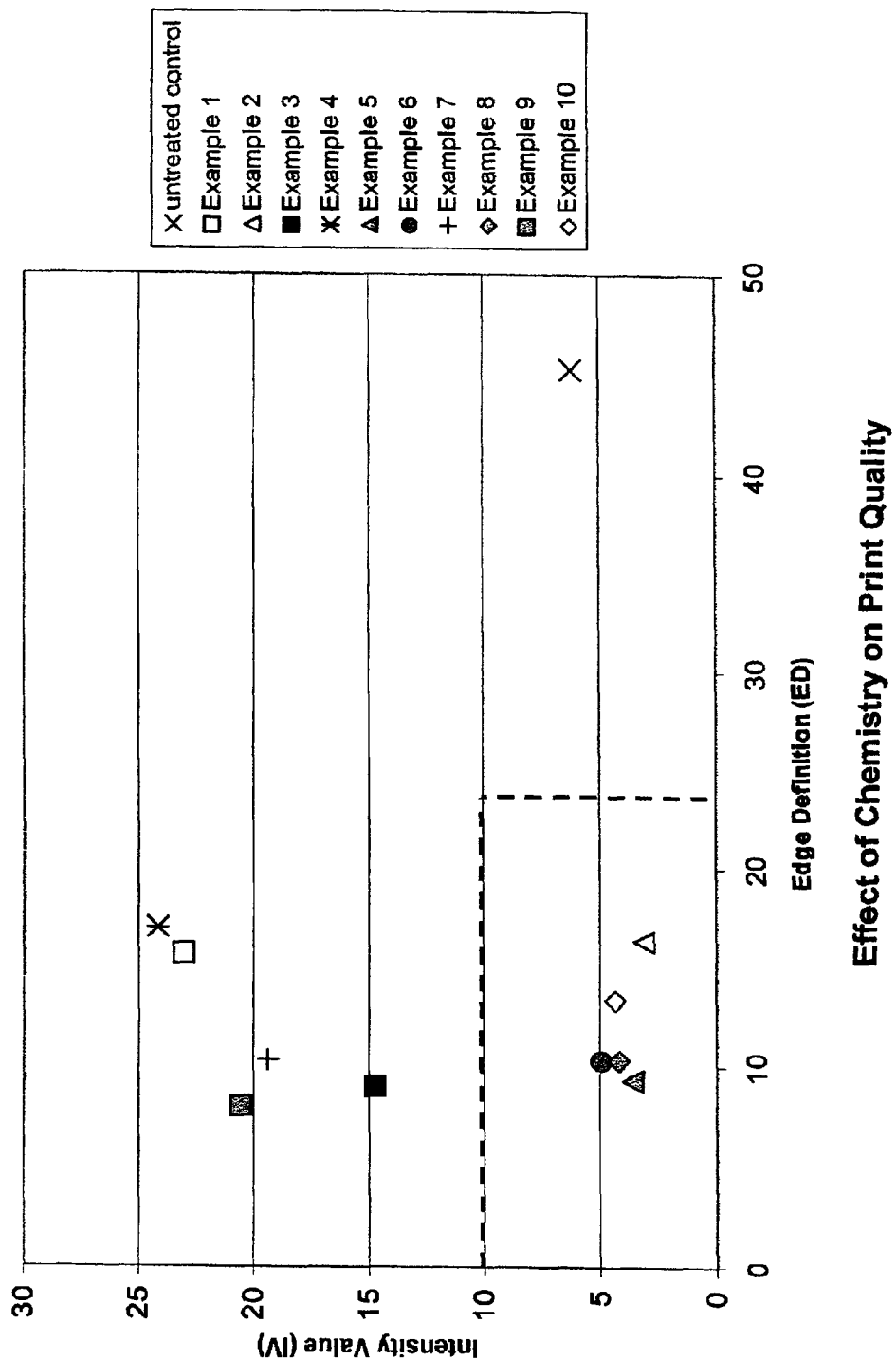
FIG. -1-

TEXTILE SUBSTRATE HAVING COATING CONTAINING MULTIPHASE FLUOROCHEMICAL AND CATIONIC MATERIAL THEREON FOR IMAGE PRINTING

BACKGROUND

The present invention generally relates to placing images on textiles, and in particular, to the treatment of textiles for enhancing the definition of the image placed upon the textile.

Images are placed upon a substrate by various methods such as digital printing. Digital printing is the process of placing various small predetermined quantities of a colorant, known as pixels, in predetermined matrix zones of a substrate. Colorants can include dyes, pigments, polymeric colorants, or combinations thereof. Additionally, colorants can include different types and colors of dyes and/or pigments. The pixels can be placed on the substrate by various methods, such as ink jet printing. Typically, digital printing uses a limited small number of different colorants, and only one of these colorants is used for a particular pixel. Variations in colors and shades in digital printing is generally accomplished in digital printing by positioning different colored pixels in adjacent or near-by matrix zones. Although the actual color of the individual pixels is not changed, the impression to a viewer is that the area containing the different colored pixels is a color or shade that is different than any of the actual pixels in the associated area. The impression is created because the pixels are of such a small nature that the viewer cannot readily perceive the individual pixels, and perceives more of an average of the pixels.

Placing images on textiles presents various difficulties not experienced in all substrates. It has been discovered by the inventors of the present invention that, due to the nature of the material in a textile, or the construction of the textile, the color medium (such as ink) used to place the image on the textile may not fill the intended zone for the medium, may bleed outside of the intended zone, or may be absorbed into the textile substrate. If the color medium does not fill the intended zone, the image placed on the textile can lose color intensity due to the presence of the underlying textile substrate color. If the color medium is absorbed into the textile, color intensity can be lost due to at least a portion of the color medium being disposed in an area of the textile that cannot be seen, and/or by the color medium failing to fill the intended zone. If the color medium bleeds outside of the intended zone, image acuity and intensity can be impacted.

These problems are of greater concern with digital printing, where the intended zones for the color medium are smaller and closer together. Furthermore, methods to correct these problems can increase the ability of the textile substrate to lose colorant due to rubbing contact with another surface. Therefore, there is a need for textiles, textile treatments, and methods which reduce the difficulties in placing an image on textiles.

BRIEF DESCRIPTION OF THE DRAWINGS

FIG. 1 is a plot of the intensity value versus edge definition for various Examples of the present invention.

DETAILED DESCRIPTION

In the present invention, a coating having cationic and repellant characteristics is coated onto the surface of a textile to receive a colorant image by processes such as digital printing. In one version of the present invention, the coating generally comprises a combination of a repellant finish chemical, a cationic material, and a sorbant polymer. In another version of the present invention, the coating generally comprises a multiphase fluorochemical, such as a "dual action" fluorochemical, and the cationic material. The version of the present invention having a multiphase fluorochemical can also include the sorbant polymer. In yet another version of the present invention, the coating generally comprises the cationic material and the sorbant polymer, wherein the cationic material comprises organic cationic materials that include at least two or more carbon atoms. The version of the present invention having organic cationic materials with two or more carbon atoms can also include the repellant finish chemical. The version of the present invention having organic cationic materials with two or more carbon atoms can also include the multiphase fluorochemical, such as the "dual action" fluorochemical.

Generally, the textile of the present invention can include banner or sign fabrics, upholstery fabrics, drapery fabrics, other fabrics for home furnishings, napery fabrics, apparel fabrics, carpeting, and the like. The textile can be a woven, knitted, non-woven material, tufted materials, and the like. Woven textiles can include, but are not limited to, satin, poplin, and crepe weave textiles. Knit textiles can include, but are not limited to, circular knit, warp knit, and warp knit with a microdenier face. The textile may be flat, or may exhibit a pile. Such textile materials can be formed of natural or synthetic fibers, such as polyester, nylon, wool, cotton, silk, polypropylene, rayon, lyocell, poly(lactide), acrylic, and the like, including textile materials containing mixtures and combinatios of such natural and synthetic fibers.

Repellant finish chemicals include fluorochemicals, silicones, resin-based finishes, waxes, wax-metal emulsions, organometallic complexes, and combinations thereof. It is believed that the repellant properties of the repellant finish chemicals help prevent the colorant from being absorbed into the textile, and facilitates allowing the colorant to fill the entire intended zone for the colorant.

Fluorochemical repellants include chemicals that contain perfluorocarbon groups. The fluorochemical repellants can be the products of copolymers of perfluoroalkyl acrylates or methacrylates with other comonomers. The comonomers include esters of acrylic or methacrylic acid containing alkyl groups, alkylamide groups, or polyether groups. The fluorochemical repellants can also be emulsions or solvent solutions for application to the textile material.

Silicone repellants include polymers of methyl(hydrogen) siloxane and dimethylsiloxane. In one embodiment, the silicones are an aqueous emulsion or a solvent solution for application to the textile material.

Resin-based finishes include modified melamine formaldehyde resin based finishes, and can be blended with waxes. In one example, the resin-based finishes are a water soluble material such as Aerotex M3 from BF Goodrich for application to the textile material.

In the version of the present invention using a "dual action", fluorochemical, the "dual action" fluorochemical is a fluorochemical that has hydrophobic properties under a first condition, and hydrophilic properties under a second condition. Typically, the two conditions changing the properties of the "dual action" fluorochemical related to the temperature. For example, the "dual action" fluorochemical can exhibit hydrophobic properties at room temperature, and hydrophillic properties at an elevated temperature. "Dual action" fluorochemicals generally have block copolymers with a fluorine containing hydrophobic segment and a hydrophilic segment. One common hydrophilic segment is an alkylene oxide containing segment. The block copolymer will typically have a backbone such as an acrylate or a urethane, which contain the hydrophobic and hydrophilic segments. It is believed that under the first condition the fluorinated segment aligns at the surface, resulting in the oil and water repellency, and that under the second condition the polyethylene oxide containing segment aligns at the surface, resulting in the hydrophilic properties. Various commerically available "dual action" fluorochemicals include FC-248 and FC-268 from 3M, Repearl F-84 and Repearl SR-216 from Mitsubishi International, and Unidyne S1040 and Unidyne TG-992 from Daikin.

It is believed that when the "dual action" fluorochemical class of repellant finish chemicals are present on the textile substrate under normal room temperatures, the "dual action" fluorochemical experiences the first condition of the hydrophobic state, thereby helping to prevent the colorant from being absorbed into the textile and facilitating the spread of the color medium to fill the entire intended zone for the color medium, just as with the standard repellant finish chemical. However, it is also believed that when the printed textile substrate is subjected to heat for fixing the colorant image, the dual action fluorochemical experiences the second condition of the hydrophilic state, thereby allowing the colorant to better penetrate the textile to help fix the color.

Cationic materials are materials that have a positive charge. The charge of the cationic material could also be a partial charge. It is believed that the cationic material helps hold the colorant on the surface of the intended zone, thereby reducing any bleeding of the color medium into unintended areas or absorption of the colorant into the textile. Cationic materials that can be used for the present invention include, but are not limited to, polymeric or non-polymeric organic compounds, and metal salts. In one version of the present invention, the cationic compounds are organic cationic materials that include two or more carbon atoms.

Polymeric cationic materials and non-polymeric organic cationic materials of the present invention, including the version of the invention having two or more carbon atoms, can include nitrogen-containing and phosphorus-containing materials. Nitrogen containing cationic materials include, but are not limited to, various primary amines (such as polyvinylamine or polyallyamine), secondary amines, tertiary amines, quaternary amines, and amines converted to cationic amines under acidic conditions. Examples of nitrogen containing cationic polymer materials include homopolymers or copolymers of cationic monomers. Cationic monomers can include diallyldimethylammonium chloride, or methacrylamidopropyltrimethyl ammonium chloride, or the like. Phosphorus containing cationic material include, but are not limited to, the phosphonium group. Examples of a phosphonium group cationic material include stearyltributyl phosphonium bromide, or the like.

Metal salts that can be used for the cationic material of the present invention include water soluble salts of cations from Group II, Group III, or the Transition Metals of the Periodic Table. Examples include magnesium, calcium, aluminum, zinc, zirconium, and boron. In one embodiment, the salts have an anion of a weak acid, such as acetate forming or the like.

The sorbant polymer is also used to fix the colorant to the textile, to create an image with good resolution and edge acuity. A sorbant polymer is a polymer that the ink components, such as dyes, have a greater affinity for than those ink components have for the textile material substrate. It is believed that the ink components, such as dyes, partition into the sorbant polymer, preventing dye migration and reducing dye sublimation during drying. Suitable polymers for use in the invention include synthetic polymers and natural polymers. Suitable synthetic polymers for use in the invention include acrylic copolymers of methyl methacrylates, methyl acrylate, butyl acrylate, urethanes, homopolymers or copolymers of vinyl acetate, or the like. Suitable natural polymers include chitosan, carboxymethyl cellulose, other polysaccharides or polyaminoglycans, or the like.

In one embodiment of the invention having a fabric with a coating of a repellant finish chemical, a cationic material, and a sorbant polymeric material, the repellant finish chemical can be present in amounts ranging from about 0.01 to about 15 dry wt. % on the weight of the fabric, with one preferred concentration of from about 0.1 to about 5 dry wt. % on weight of fabric, the concentration of the cationic material can be from about 0.005 to about 35 dry wt. % on the weight of the fabric, with one preferred concentration of from about 0.01 to about 15 dry wt. % on the weight of the fabric, and the concentration of the sorbant polymer material can be from about 0.01 to about 60 dry wt. % on weight of fabric, with one preferred concentration of from about 0.1 to about 10 dry wt. % on the weight of the fabric.

In one embodiment of the invention having fabric with a coating of the multiphase fluorochemical, such as the "dual action" fluorochemical, and the cationic material, the multiphase fluorochemical can be present in amounts ranging from about 0.01 to about 15.0 dry wt. % on the weight of the fabric, with one preferred concentration of from about 0.1 to about 5 dry wt. % on weight of fabric, and the concentration of the cationic material can be about 0.005 to about 35 dry wt. % on the weight of the fabric, with one preferred concentration of about 0.01 to about 15 dry wt. % on the weight of the fabric.

In one embodiment of the invention having a fabric with a coating of a multiphase fluorochemical, such as the "dual action" fluorochemical, a cationic material, and a sorbant polymeric material, the multiphase fluorochemical can be present in amounts ranging from about 0.01 to about 15 dry wt. % on the weight of the fabric, with one preferred concentration of from about 0.1 to about 5 dry wt. % on the weight of the fabric, the concentration of the cationic material can be from about 0.005 to about 35 dry wt. % on the weight of the fabric, with one preferred concentration of from about 0.01 to about 15 dry wt. % on the weight of the fabric, and the concentration of the sorbant polymer can be from about 0.01 to about 60 dry wt. % on the weight of the fabric, with one preferred concentration of about 0.1 to about 10 dry wt % on the weight of the fabric.

In one embodiment of the invention having a fabric with a coating of the organic cationic material containing at least two or more carbon atoms and the sorbant polymer, the organic cationic material containing at least two or more carbon atoms may be present in amounts ranging from about 0.005 to about 35 dry wt. % on the weight of the fabric, with one preferred concentration of about 0.01 to about 15 dry wt. % on the weight of the fabric, and the sorbant polymer can be present in amounts ranging from about 0.01 to about 60 dry wt. % on the weight of the fabric, with one preferred concentration of about 0.1 to about 10 dry wt % on the weight of the fabric.

In one embodiment of the invention having a fabric with a coating of the repellant finish chemical, the organic cationic material containing at least two or more carbon atoms, and the sorbant polymer, the repellant finish chemical can be present in amounts ranging from about 0.01 to about 15 dry wt. % on the weight of the fabric, with one preferred concentration of from about 0.1 to about 5 dry wt. % on weight of fabric, the organic cationic material containing at least two or more carbon atoms may be present in amounts ranging from about 0.005 to about 35 dry wt. % on the weight of the fabric, with one preferred concentration of about 0.01 to about 15 dry wt. % on the weight of the fabric, and the sorbant polymer can be present in amounts ranging from about 0.01 to about 60 dry wt. % on the weight of the fabric, with one preferred concentration of about 0.1 to about 10 dry wt % on the weight of the fabric.

In one embodiment of the invention having a fabric with a coating of the multiphase fluorochemical, such as the "dual action" fluorochemical, the organic cationic material containing at least two or more carbon atoms, and the sorbant polymer, the multiphase fluorochemical can be present in amounts ranging from about 0.01 to about 15 dry wt. % on the weight of the fabric, with one preferred concentration of from about 0.1 to about 5 dry wt. % on the weight of the fabric, the organic cationic material containing at least two or more carbon atoms may be present in amounts ranging from about 0.005 to about 35 dry wt. % on the weight of the fabric, with one preferred concentration of about 0.01 to about 15 dry wt. % on the weight of the fabric, and the sorbant polymer can be present in amounts ranging form about 0.01 to about 60 dry wt. % on the weight of the fabric, with one preferred concentration of about 0.1 to about 10 dry wt % on the weight of the fabric.

The image on the textile is created by a colorant. The colorant can be dyes, pigments, polymeric colorants, or a combination thereof. Dyes may include disperse dyes, acid dyes, reactive dyes, direct dyes, vat dyes, sulfur dyes, and the like. The colorant can be a component of a material such as an ink. The ink can be an aqueous and/or non-aqueous solution based material, with the colorant being a dispersion or a solution therein. An example of the aqueous dispersion type ink is the DI Series (Yellow GWL, etc.) from Ciba, Inc. An example of a non-aqueous solvent type ink is the PzO Series (cyan, magenta, yellow etc.) from A.R. Monteith. Inc. The colorant can be any color, including black and/or white.

In a procedure of the present invention, the coating having cationic and repellant properties is applied to the textile and then the image is placed upon the surface of the textile having the coating thereon. In one embodiment, the coating is applied to the textile substrate in an aqueous solution. The aqueous solution can be applied to the surface of the textile to receive the image, or the entire textile can be dipped into the aqueous solution. After the aqueous coating is place on the textile, the textile is typically squeezed between rolls to remove excess aqueous solution, and then dried. The image can then be placed on the textile using digital printing, such as from a digital or ink jet printer.

The embodiments of the present invention, comprising a "dual action" fluorocarbon repellant chemical, and a cationic material, with or without a sorbant polymer, exhibit improved edge definition and color intensity than embodiments made with other types of repellant chemicals. Plotting a measure of edge definition versus a measure of color intensity allows us to define a region of performance, characteristic of the present invention comprising a "dual action" fluorocarbon repellant chemical and a cationic material, with or without a sorbant polymer.

Textile samples cut from a sateen fabric, which was woven from 100% polyester textured continuous filament yarn, using a 1/75/36 yarn for the warp and a 1/150/36 yarn for the weft, for a fabric weight of 3.30 oz./yd.$^2$. The textile samples were coated with mixtures as indicated in Table 1, with a wet pickup of 100%, to form Examples 1–10.

TABLE 1

| Example No. | Coating |
|---|---|
| 1 | 2% Zonyl 8300 from Ciba (fluorocarbon dispersion, 14–20% solids), 0.25% PolyCat M-30 from Peach State Labs (solution of quaternary ammonium derivative of acrylic polymer solution, 30% solids), balance water |
| 2 | 2% Repearl SR1100 from Mitsubishi (multiphase fluorochemcial or "dual action" fluorocarbon dispersion, 20% solids), 0.25% PolyCat M-30 from Peach State Labs (solution of quaternary ammonium derivative of acrylic polymer solution, 30% solids), balance water |
| 3 | 2% Repearl 8025 by Mitsubishi (fluorocarbon dispersion, 30% solids), 0.25% PolyCat M-30 from Peach State Labs (solution of quaternary ammonium derivative of acrylic polymer solution, 30% solids), balance water |
| 4 | 2% Foraperle 501 by Elf Atochem (fluorocarbon dispersion, 20% solids), 0.25% PolyCat M-30 from Peach State Labs (solution of quaternary ammonium derivative of acrylic polymer solution, 30% solids), balance water |
| 5 | 2% Repearl F-84 by Mitsubishi (multiphase fluorochemcial or "dual action" fluorocarbon dispersion, 20% solids), 0.25% PolyCat M-30 from Peach State Labs (solution of quaternary ammonium derivative of acrylic polymer solution, 30% solids), balance water |
| 6 | 1% Unidyne TG-992 by Daikin (multiphase fluorochemical or "dual action" fluorocarbon), 0.75% Witcobond W-213 by Crompton-Knowles (cationic urethane dispersion, 30% solids), 0.25% PolyCat M-30 from Peach State Labs (solution of quaternary ammonium derivative of acrylic polymer solution, 30% solids), balance water |
| 7 | 1% Zonyl 8300 by Ciba (fluorocarbon dispersion, 14–20% solids), 0.75% Witcobond W-213 by Crompton-Knowles (cationic urethane dispersion, 30% solids), 0.25% PolyCat M-30 from Peach State Labs (solution of quaternary ammonium derivative of acrylic polymer solution, 30% solids), balance water |
| 8 | 1% Repearl F-84 by Mitsubishi (multiphase fluorochemcial or "dual action" fluorocarbon dispersion, 20% solids), 0.75% Witcobond W-213 by Crompton-Knowles (cationic urethane dispersion, 30% solids), 0.25% PolyCat M-30 from |

TABLE 1-continued

| Example No. | Coating |
|---|---|
| | Peach State Labs (solution of quaternary ammonium derivative of acrylic polymer solution, 30% solids), balance water |
| 9 | 1% Repearl 8025 by Mitsubishi (fluorocarbon dispersion, 30% solids), 0.75% Witcobond W-213 by Crompton-Knowles (cationic urethane dispersion, 30% solids), 0.25% PolyCat M-30 from Peach State Labs (solution of quaternary ammonium derivative of acrylic polymer solution, 30% solids), balance water |
| 10 | 1% Repearl SR1100 by Mitsubishi (multiphase fluorochemcial or "dual action" fluorocarbon dispersion, 20% solids), 0.75% Witcobond W-213 by Crompton-Knowles (cationic urethane dispersion, 30% solids), 0.25% PolyCat M-30 from Peach State Labs (solution of quaternary ammonium derivative of acrylic polymer solution, 30% solids, balance water |

The coated textiles of Examples 1–10 were then printed with a test pattern of 50 mm diameter black, red, yellow, blue, and magenta dots using a HP 648C Deskjet digital printer (black, red, yellow, blue) and a HP 540C digital printer (magenta.) The inks used were pigment based (black), acid dye based (blue, red, and yellow), or disperse dye-based (magenta.) The black ink used was obtained from Hewlett Packard in a pre-packaged cartridge form, cartridge model 6614n. The blue, red, and yellow inks used were obtained from Hewlett Packard in a pre-packaged cartridge form, cartridge model 51649n. The magenta circles were printed on a separate pieces of coated textiles using a HP540 Deskjet digital printer, using a Hewlett Packard ink cartridge (model 51626A) that had been drained, cleaned, and refilled with Ciba Terasil Red TI-M ink. All textiles were then dried for 3 minutes at 350° F. in an Despatch oven, model LTC 2–16, then allowed to cool completely prior to reading the color of the dots. The color of each of the dots was measured with a HunterLab DP-9000 colorometer.

The variations in color intensity between samples and the textile background was measured with a modification of The Engineering Society for Advancing Mobility Land Sea Air and Space Textile Test method SAE-J-1885, "(R) Accelerated Exposure of Automotive Interior Trim Components Using a Controlled Irradiance Water Cooled Xenon-Arc Apparatus." The modification of the test was that the initial measurement was on the background (or area not printed) and the final measurement was on the printed area. A measure of color intensity, $\Delta E_p$, may be determined by this method. $\Delta E_p$ is generally calculated according to the following equation:

$$\Delta E_p = ((L_{background} - L_{printed})^2 + (a_{background} - a_{printed})^2 + (b_{background} - b_{printed})^2)^{1/2}$$

wherein $\Delta E_p$ represents the difference in color between the background textile and the textile after printing. L, a, and b are the color coordinates; wherein L is a measure of the lightness or darkness of the colored fabric; a is a measure of the redness or greenness of the colored fabric; and b is a measure of the yellowness or blueness of the colored fabric. A greater $\Delta E_p$ value results in a higher intensity of the color. $\Delta E_p$ values were measured for each of the colors (black, red, blue, yellow, and magenta) and are reported as $\Delta E_{color}$, for example, $\Delta E_{black}$.

For the purpose of simplifying the visualization of the relationship between the color intensity and the edge definition, a tranformation of the $\Delta E_p$ values was used. An Intensity Value (IV) was defined according to the following equations:

$$\Delta E_{net} = ((\Delta E_{black})^2 + (\Delta E_{red})^2 + (\Delta E_{yellow})^2 + (\Delta E_{blue})^2 + (\Delta E_{magenta})^2)^{1/2}$$

$$IV = 10^{((159 - \Delta E_{net})/30)}$$

Using this convention, color intensity increases with decreasing values of the Intensity Value (IV) metric.

Edge definition is a measure of the raggedness of the edge of a printed design element. Raggedness (R) was measured by taking a ratio of the measured dot circumference to the intended dot circumference, according to the method described below.

Raggedness determination was made using digital images captured of the printed dots on the Examples 1–10. Images were acquired using a Javelin Electronics Chromochip II Camera equipped with a Olympus OM-System Zuiko Auto-Macro 50 mm C-Mount Camera Lens and interfaced with an Integral Technologies FlashBus MV video capture card integrated with an IBM 300PL desktop computer. The camera was mounted at a distance of 53 cm from object to lens surface, at an angle of 90° from surface of object to be imaged, and the fluorescent ring light was positioned in line with camera and object at a distance of 41 cm from the object. An image of the dot, used for raggedness determination, was acquired using Image Pro Plus 4.5 software using a lens aperture of 4. Once the image of the printed dot was acquired, the image was analyzed using the Image Pro Plus 4.5 software to determine the actual perimeter of the printed dot and the calculated ideal perimeter of the printed dot.

To calculate the ideal perimeter of the printed dot, the Image Pro Plus 4.5 software was used to select a rectangular area of the image that encompassed the entire printed dot. The selected area was then converted to "Gray Scale 8" to facilitate measurement. The area of the printed dot was then measured using the Image Pro Plus 4.5 software by segmenting the image of the printed dot from the background by applying an auto threshold filter and manually selecting the area of the printed dot as the object to measure. This was done, more specifically, by selecting "Measure" from the menubar, selecting "Count/Size" from the proceeding menu, selecting "Measure" from the proceeding menu, selecting "Select Measurements" from the proceeding menu, selecting "area" from the proceeding menu, then selecting "OK" to make a measurement of the selected object area; from the "Count/Size" menu selecting the "manual" radio button and then selecting the "Select Ranges" button and from the "Segmentation" window clicking on the auto threshold button to segment the object from the background and select it, making sure the "manual", "measure objects" and "apply filter ranges" radio buttons were selected, to select the object area; and by selecting the "Count" button from the "Count/Size" window, then selecting "Measure" and "Select Measurements" from the "Count/Size" window, selecting "Edit Range" from the proceeding menu and adjusting the range so only the object of interest was selected, then selecting "Measure" to measure the area of the selected area. This data represented the area of the overall shape of the object (dot), excluding the outermost ragged perimeter. This area measurement ($A_1$) can be used to determine an ideal calculated perimeter, in this case, a circumference, ($P_{calc}$) using the following equation:

$$P_{calc}=2\pi(A_1/\pi)^{1/2}$$

To measure the actual perimeter of the printed dot, the Image Pro Plus 4.5 software was used to select a rectangular area of the image that encompassed the entire printed dot. The selected area was then converted to "Gray Scale 8" to facilitate measurement. The area of the printed dot was then measured by selecting "Measure" from the menubar, selecting "Count/Size" from the proceeding menu, selecting "Measure" from the proceeding menu, selecting "Select Measurements" from the proceeding menu, selecting "Select None" then selecting "Perimeter" from the proceeding menu, then selecting "OK" to make a measurement of the selected object area; from the "Count/Size" menu selecting the "manual" radio button and then selecting the "Select Ranges" button and from the "Segmentation" window clicking on the auto threshold button and adding 30 to the thresholded gray level, if the threshold level <230, to segment the object from the background and select it, making sure the "manual", "measure objects" and "apply filter ranges" radio buttons were selected; and by selecting the "Count" button from the "Count/Size" window, then selecting "Measure" and "Select Measurements" from the "Count/Size" window, selecting "Edit Range" from the proceeding menu and adjusting the range so only the object of interest was selected, then selecting "Measure" to measure the perimeter of the selected area. The Image Pro Plus 4.5 software was then used to export the area measurement to Microsoft Excel spreadsheet file. This data represented the perimeter ($P_{meas}$) of the overall shape of the object (dot), including the outermost ragged perimeter.

Raggedness (R) represents the difference between the ideal object perimeter and the actual object perimeter and was calculated using the following equation:

$$R=P_{meas}/P_{calc}$$

For the purpose of simplifying the visualization of the relationship between the color intensity and the edge definition, a transformation of the raggedness measurement was used. Edge Definition (ED) was defined according to the following equation:

$$ED=1000*(R-1)$$

Using this convention, edge definition increases with decreasing values of the Edge Definition (ED) metric.

FIG. 1 is a plot of the intensity value (IV) versus the edge definition (ED) on a linear scale for Examples 1–10, in comparison with the untreated, or control, textile, provides a visual representation of print quality of the sample. Textiles coated with an embodiment of the present invention comprising a multiphase fluorochemical repellant on the polyester satin cloth had data points within the area described by ED<20 and IV<10.

The present invention can be further understood with reference to the following further Examples:

EXAMPLES 11–13

Examples 11–13 are examples of the version of the present invention where the coating is a combination of repellant finish chemical, cationic material, and an emulsion of synthetic polymer.

EXAMPLE 11

100 parts REPEARL 8025 by Mitsubishi Chemicals (fluorocarbon dispersion, 30% solids), 75 parts WITCO-BOND W-213 by Crompton-Knowles (cationic urethane dispersion, 30% solids), and 25 parts LUPASOL PR8515 by BASF (polyethylenimine solution, >98%) were added to 9800 parts water, stirred to mix, and applied to a polyester knit fabric with a wet pickup of 60%. The coated fabric was dried at 350° F. for 3 minutes, and then ink-jet printed to yield a printing with good resolution and color depth.

EXAMPLE 12

200 parts REPEARL F-84 by Mitsubishi Chemicals (multiphase fluorochemcial or "dual action" fluorocarbon dispersion, 20% solids), 55 parts WITCOBOND W-320 by Crompton-Knowles (nonionic urethane dispersion, 60% solids), and 50 parts POLYCAT M-30 by Peach State Labs (solution of quaternary ammonium derivative of acrylic polymer solution, 30% solids) were added to 9700 parts water, stirred to mix, and applied to a polyester woven fabric with a wet pickup of 60%. The coated fabric was dried at 350° F. for 3 minutes and then ink-jet printed to yield a printing with good resolution and color depth.

EXAMPLE 13

250 parts FORAPERLE 501 by Elf Atochem (fluorocarbon dispersion, 20% solids), 75 parts WITCO-BOND W-213 (cationic urethane dispersion, 30% solids), and 25 part POLYCAT M-30 (solution of quaternary ammonium derivative of acrylic polymer solution, 30% solids) were added to 9650 parts water, stirred to mix, and applied to a polyester knit fabric with a wet pickup of 60%. The coated fabric was dried at 350° F. for 3 minutes then ink-jet printed to yield a printing with good resolution and color depth.

EXAMPLES 14–15

Examples 14–15 are examples of the version of the present invention where the coating is a combination of "dual action" fluorochemical and cationic material.

EXAMPLE 14

17 parts POLYCAT M-30 (solution of quaternary ammonium derivative of acrylic polymer, 30% solids) and 5 parts REPEARL SR1100 by Mitsubishi Chemicals (multiphase fluorochemcial or "dual action" fluorocarbon dispersion, 20% solids) were added to 78 parts water, stirred to mix, and applied to a fabric with a wet pickup of 60%. The coated fabric was dried at 350° F. for 3 minutes then ink-jet printed to yield a printing with good resolution and color depth.

EXAMPLE 15

25 parts NALKAT 8108 Plus and 2.5 parts REPEARL F-84 (multiphase fluorochemcial or "dual action" fluorocarbon dispersion, 20% solids) were added to 72.5 parts water, stirred to mix, and applied to a fabric with a wet pickup of 60%. The coated fabric was dried at 350° F. for 3 minutes then ink-jet printed to yield a printing with good resolution and color depth.

EXAMPLES 16–17

Examples 16–17 are examples of the version of the present invention where the coating is a combination of the cationic material and the emulsion of synthetic polymer, wherein the cationic material comprises polymeric or non-polymeric organic materials that include at least two or more carbon atoms.

EXAMPLE 16

11 parts RHOPLEX K-3 by Rohm & Haas (nonionic acrylic dispersion, 46% solids) and 10 parts NALKAT 8108 Plus by Nalco (polyDADMAC solution, 20% solids) were added to 79 parts water, stirred to mix, and applied to a fabric with a wet pickup of 60%. The coated fabric was dried at 350° F. for 3 minutes then ink-jet printed to yield a printing with good resolution and color depth.

EXAMPLE 17

17 parts ROVACE S-117 by Rohm & Haas (polyvinylacetate dispersion, 30% solids) and 7 parts POLY-CAT M-30 (solution of quaternary ammonium derivative of acrylic polymer solution, 30% solids) were added to 93.5 parts water, stirred to mix, and applied to a fabric with a wet pickup of 60%. The coated fabric was dried at 350° F. for 3 minutes then ink-jet printed to yield a printing with good resolution and color depth.

What is claimed is:

1. A device comprising:
    a textile substrate having a first surface;
    a coating on the first surface of said textile substrate, said coating including a multiphase fluorochemical and a cationic material, wherein the multiphase fluorochemical comprises a dual action fluorochemical, wherein the dual action fluorochemical is a fluorochemical that has hydrophobic properties under a first condition and hydrophilic properties under a second condition,
    and further including an image disposed on the first surface of said textile having the coating thereon.

2. The device according to claim 1, wherein the image disposed on said textile comprises a colorant selected from the group consisting of: dyes, pigments, and polymeric colorants.

3. The device according to claim 1, wherein the cationic material of said coating comprises a non-polymeric organic compound.

4. The device according to claim 1, wherein the cationic material of said coating comprises a metal salt.

5. The device according to claim 4, wherein the metal salt comprises a water soluble salt of cations selected from the group of the periodic table consisting of: Group II, Group III, and the Transition Metals.

6. The device according to claim 1, wherein the multiphase fluorochemical is present on the textile in an amount ranging from about 0.01 to about 15 dry weight percent on the weight on the textile.

7. The device according to claim 1, wherein the multiphase fluorochemical is present on the textile in an amount ranging from about 0.1 to about 5 dry weight percent on the weight on the textile.

8. The device according to claim 1, wherein the cationic material is present on the textile in an amount ranging from about 0.0005 to about 35 dry weight percent on the weight on the textile.

9. The device according to claim 1, wherein the cationic material is present on the textile in an amount ranging from about 0.01 to about 15 dry weight percent on the weight on the textile.

10. The device according to claim 1, wherein the textile comprises a woven fabric.

11. The device according to claim 1, wherein the textile comprises a knit fabric.

12. The device according to claim 1, wherein the textile comprises a nonwoven material.

13. The device according to claim 1, wherein the textile comprises a pile material.

14. The device according to claim 1, wherein the first condition and second condition are different temperatures.

* * * * *

UNITED STATES PATENT AND TRADEMARK OFFICE
CERTIFICATE OF CORRECTION

| | | |
|---|---|---|
| PATENT NO. | : 7,037,346 B2 | Page 1 of 1 |
| APPLICATION NO. | : 10/044173 | |
| DATED | : May 2, 2006 | |
| INVENTOR(S) | : Cates et al. | |

It is certified that error appears in the above-identified patent and that said Letters Patent is hereby corrected as shown below:

Claim 8, line 23 "0.0005" should read "0.005".

Signed and Sealed this

Eighth Day of August, 2006

JON W. DUDAS
*Director of the United States Patent and Trademark Office*